United States Patent
Otto-Luebker

(10) Patent No.: US 9,907,294 B2
(45) Date of Patent: Mar. 6, 2018

(54) CONTROL FEEDING PAN AND FEEDING SYSTEM FOR POULTRY KEEPING

(71) Applicant: Friedrich Otto-Luebker, Badbergen Ortsteil Vehs (DE)

(72) Inventor: Friedrich Otto-Luebker, Badbergen Ortsteil Vehs (DE)

(73) Assignee: BIG DUTCHMAN INTERNATIONAL GmbH, Vechta (DE)

(*) Notice: Subject to any disclaimer, the term of this patent is extended or adjusted under 35 U.S.C. 154(b) by 246 days.

(21) Appl. No.: 14/566,869

(22) Filed: Dec. 11, 2014

(65) Prior Publication Data

US 2015/0164051 A1   Jun. 18, 2015

(30) Foreign Application Priority Data

Dec. 12, 2013 (DE) .................... 20 2013 010 980 U

(51) Int. Cl.
*A01K 39/012* (2006.01)
*A01K 39/014* (2006.01)
*A01K 39/01* (2006.01)

(52) U.S. Cl.
CPC .......... *A01K 39/0125* (2013.01); *A01K 39/01* (2013.01); *A01K 39/012* (2013.01); *A01K 39/014* (2013.01)

(58) Field of Classification Search
CPC .. A01K 39/0125; A01K 39/01; A01K 39/012; A01K 39/014; A01K 5/02–5/0291
USPC ..... 119/51.11, 51.01, 57.7, 57.92, 61.2, 61.3
See application file for complete search history.

(56) References Cited

U.S. PATENT DOCUMENTS

| | | | |
|---|---|---|---|
| 3,192,902 A * | 7/1965 | Gammill | A01K 5/0216 119/51.11 |
| 3,241,653 A | 3/1966 | Van Huis | |
| 3,272,400 A | 9/1966 | Van Huis | |
| 3,273,759 A | 9/1966 | Rigterink et al. | |
| 3,276,567 A | 10/1966 | Hartman | |
| 3,285,230 A | 11/1966 | Van Huis et al. | |
| 3,292,586 A | 12/1966 | Rigterink | |
| 3,302,617 A | 2/1967 | Bares et al. | |
| 3,312,328 A | 4/1967 | Carpenter | |

(Continued)

FOREIGN PATENT DOCUMENTS

| CA | 829126 | 12/1969 |
|---|---|---|
| CA | 829127 | 12/1969 |

(Continued)

OTHER PUBLICATIONS

German Patent Office Search Report for Applicant Big Dutchman International GmbH, German Patent Appl. No. 202013010980.7, dated Nov. 5, 2014.

*Primary Examiner* — Marc Burgess
(74) *Attorney, Agent, or Firm* — Price Heneveld LLP

(57) ABSTRACT

The invention relates to a control feeding pan for use in a feeding system for poultry keeping, comprising a mounting element for mounting the feeding pan to a conveyor line; a feeding dish; a feeding shaft through which feed gets from a conveyor line to the feeding dish; a filling level sensor which is arranged and formed to generate a drive control signal; characterized by a signal unit arranged and formed to emit a feed signal that can be perceived by the poultry.

18 Claims, 7 Drawing Sheets

(56) References Cited

U.S. PATENT DOCUMENTS

| | | | |
|---|---|---|---|
| 3,349,853 A | 10/1967 | Flint et al. | |
| 3,389,689 A | 6/1968 | Van Huis | |
| 3,394,681 A | 7/1968 | Rigterink et al. | |
| 4,416,218 A | 11/1983 | Holz | |
| 4,603,657 A | 8/1986 | Peckskamp | |
| 5,022,347 A | 6/1991 | DenBleyker | |
| 5,406,907 A | 4/1995 | Hart | |
| 5,517,944 A * | 5/1996 | Bate | A01K 39/012 119/53 |
| 5,794,562 A | 8/1998 | Hart | |
| 5,927,232 A * | 7/1999 | Pollock | A01K 39/0125 119/53 |
| 5,937,787 A * | 8/1999 | Kopis | A01K 5/0208 119/52.2 |
| 5,964,184 A | 10/1999 | Hart | |
| 6,539,893 B1 | 4/2003 | Otto-Lubker et al. | |
| 6,681,718 B1 * | 1/2004 | McIlarky | A01K 5/0291 119/51.11 |
| 7,228,817 B2 | 6/2007 | Busse | |
| 7,552,697 B2 | 6/2009 | Busse | |
| 7,789,041 B1 * | 9/2010 | Taylor | A01K 5/0114 119/51.01 |
| 8,707,908 B2 | 4/2014 | Grave et al. | |
| 2004/0040519 A1 * | 3/2004 | Rucker | A01K 5/0291 119/707 |
| 2010/0275851 A1 * | 11/2010 | Yin | A01K 15/021 119/51.02 |
| 2013/0036976 A1 | 2/2013 | Pickens | |
| 2013/0305994 A1 | 11/2013 | Dubinsky | |
| 2014/0090601 A1 * | 4/2014 | Stone | A01K 5/0114 119/51.01 |
| 2015/0068463 A1 * | 3/2015 | Worry | A01K 5/0114 119/57.1 |

FOREIGN PATENT DOCUMENTS

| | | |
|---|---|---|
| CA | 831298 | 1/1970 |
| CA | 835679 | 3/1970 |
| CA | 847704 | 7/1970 |
| EP | 459319 | 12/1991 |
| GB | 1129651 | 10/1968 |
| GB | 1306430 | 2/1973 |

* cited by examiner

CONTROL FEEDING PAN AND FEEDING SYSTEM FOR POULTRY KEEPING

The invention relates to a control feeding pan for the use in a feeding system for poultry keeping, in particular in barns, and a feeding system for poultry keeping with the control feeding pan.

FIELD OF THE INVENTION

In modern industrial poultry keeping, a large number of poultry is mostly kept in barns. Feeding systems are used to feed the poultry. Such feeding systems typically comprise conveyor lines to convey feed to a plurality of feeding pans. To control the feed supply to the feeding pans via conveyor lines, so-called control feeding pans are being used which are equipped with a filling level sensor which, depending on the fill level in the control feeding pan, generates a drive control signal which can control the feed supply to the feeding pans.

In existing feeding systems with known control feeding pans, it happens frequently in practice that individual or a plurality of feeding pans in a barn are not filled or are insufficiently filled with feed, which is detrimental to poultry feeding.

Therefore, the object of the present invention is to provide a control feeding pan and a feeding system that minimizes or eliminates one or several of the mentioned disadvantages.

SUMMARY OF THE INVENTION

According to the invention, this object is accomplished by a control feeding pan for the use in a feeding system for poultry keeping, comprising a mounting element for mounting the feeding pan to a conveyor line; a feeding dish; a feeding shaft through which feed gets from a conveyor line to the feeding dish; a filling level sensor which is arranged and formed to generate a drive control signal; wherein a signal unit is arranged and formed to emit a feed signal that can be perceived by the poultry.

A control feeding pan is preferably part of a feeding system which comprises, in addition to the control feeding pan, further feeding pans. A control feeding pan in particular differs from normal feeding pans in that it has a filling level sensor.

The control feeding pan is preferably designed as follows: It has a mounting element which makes it possible to mount the control feeding pan either rigidly to or so that it can swing freely from a conveyor line that is mostly positioned horizontally in the barn. The feed passes from the conveyor line preferably through openings in the conveyor line via a feeding shaft into a feeding dish, from which poultry can take up feed.

The filling level sensor can, preferably depending on the fill level of feed in the control feeding pan, in particular in the feeding shaft of the control feeding pan, generate a drive control signal and preferably transmit it directly or indirectly (wired or wireless) to a conveyor drive of a conveyor line. The conveyor drive can be driven, in particular activated and/or stopped, by the drive control signal.

The drive control signal is preferably determined in relation to the fill level of the control feeding pan, i.e., according to the amount of the feed available in the control feeding pan. For example, the filling level sensor can generate a drive control signal if a specific minimum filling level and/or a specific maximum filling level is not reached and/or exceeded. Two filling level sensors or one filling level sensor with two sensors can be provided which detect the different filling levels and whether they are below or above the threshold.

A feeding system usually has at least one conveyor line which can, for example, be designed as conveyor pipe, conveyor spiral, or an auger driven by a conveyor drive so that the feed is preferably transported from a feed container, or possibly via a feeding machine, through the conveyor line and dispensed through openings in the conveyor line to the feeding and control feeding pans. A combination of feed container, conveyor line with conveyor drive and at least one feeding pan, as well as at least one control feeding pan, can also be described as a feed line. A poultry barn usually comprises several, preferably independently controlled, feed lines which preferably essentially extend over the entire length of the barn. The feed lines are usually oriented in longitudinal direction along the barn. Besides individual, preferably parallel feed lines, circuits can also be used as conveyor system.

At the beginning of the barn, the feed lines can be connected via a distribution line to a distribution drive over which feed can be conveyed from a silo to the individual conveyor lines of the feed lines. Several distribution lines with several distribution drives can also be provided.

The drive control signal of a control feeding pan can preferably serve to control a conveyor drive of a conveyor line, several conveyor drives of several conveyor lines, a distribution drive of a distribution line, and/or several distribution drives of several distribution lines. A distribution drive of a distribution line can, for example, also be controlled by means of sensors in the respective feed containers.

In the feed line, the feed is usually conveyed through the conveyor line from feeding pan to feeding pan, starting from the beginning of the barn to the end of the barn. Conveyance can be designed in such a way that, when a feeding pan is completely filled, it is conveyed to the next feeding pan of a feed line. Preferably, a feeding pan is designed as a control feeding pan at the end of a feed line, for example the last feeding pan, i.e., the feeding pan arranged at the end of the barn of a conveyor line. Several feeding pans can also be designed as control feeding pans.

The filling level sensor monitors the fill level of the feed in the control feeding pan, preferably continuously, and generates a drive control signal that activates or stops the conveyor drive of a feed line and/or the distribution drive a distribution line.

The invention is based, among other things, on the knowledge that poultry favor individual feeding pans over others, and that different feeding pans differ in how often they are frequented. In particular, if the poultry does not frequent the feeding pans designed as control feeding pans often enough, it may happen that the feed level in the control feeding pans remains high and the filling level sensor therefore detects an adequate filling level and does not generate a drive control signal to activate the conveyor drives. This can result in the fact that the other feeding pans that are more frequently visited are emptied by the poultry before the control feeding pan, and are not refilled over a longer period of time. Thus, these feeding pans provide only very little or no feed at all to the poultry, which is detrimental to poultry feeding. In feeding systems with several feed lines, a control feeding pan that is not or very poorly frequented can impact on the feeding of several feed lines, since these are usually fed over a joint distribution line. For example, a below-average feed uptake at a control feeding pan of the last feed line of a barn can lead to a plurality of feeding pans in the overall barn being undersupplied.

According to the invention, a signal unit that can emit a feeding signal is therefore provided in the control feeding pan. This feeding signal can be perceived by the poultry and is preferably designed in such a way that it attracts the poultry. This feeding signal can serve to encourage the poultry to visit the control feeding pan more frequently. That way it can be made sure that the control feeding pan is strongly frequented. High frequentation of the control feeding pan can reduce or eliminate the described disadvantages of the other feeding pans being undersupplied.

The feeding signal is emitted by the signal unit preferably in direction of the environment, i.e., in the direction of the poultry. Seen from a longitudinal axis of the control feeding pan, which mostly is the vertical axis, the feeding signal is preferably emitted in radial direction within an area of 180 to 360 degrees so as to be perceived by the poultry all around or in a circle segment that is as large as possible. Furthermore, the signal unit is preferably designed so as to emit the feeding signal in an angle to the horizontal of −80 to +80 degrees, i.e., diagonally downwards to the floor of the barn as well as diagonally upwards to the barn ceiling. The upper limit can preferably be 0 degrees (according to the horizontal), +5 degrees, +10 degrees, +15 degrees, +20 degrees, +25 degrees, +30 degrees, +45 degrees, or +60 degrees. The lower limit can preferably be −70 degrees, −60 degrees, −50 degrees, −45 degrees, −40 degrees, −30 degrees, −25 degrees, −20 degrees, −15 degrees, −10 degrees, −5 degrees. The range and direction of the feeding signal to be emitted by the signal unit is preferably coordinated to the respective poultry and, in particular, to their size, for example chicks, ducks, broilers, or turkeys.

The signal unit is preferably designed to emit a visual, acoustic and/or olfactory feeding signal and/or a vibration feeding signal. Furthermore, the signal unit is preferably designed to emit, as a feeding signal, preferably electromagnetic radiation, in particular light and/or heat radiation and/or a magnetic field that can be perceived by poultry. Furthermore, it is preferred that a signal unit comprises a source of radiation, in particular a light source and/or a sound source, for example a speaker. Preferably, the signal unit is designed as a combination of a light source and a speaker so as to emit visual and acoustic feeding signals at the same time.

The signal source can preferably emit light within a visible range, with a wavelength of around 380 nm to 780 nm and frequencies of around 789 THz to 384 THz. In particular, it is preferred that the signal unit as feeding signal can emit blue and/or violet light and/or ultraviolet radiation. Preferably, radiation with a wavelength of 380-420 nm and a frequency of 789.5-714.5 THz is emitted as violet light. Preferably, radiation with a wavelength of 420-490 nm and a frequency of 714.5-612.5 THz is emitted as blue light. Preferably, radiation with a wavelength of 100-380 nm and a frequency of 789 THz to 310 PHz is emitted as ultraviolet radiation. Blue and/or violet light and/or ultraviolet radiation are particularly preferred since they can particularly attract poultry. Furthermore, blue and/or violet light and/or ultraviolet radiation can help the animals to find the feed.

Light emitting diodes (LEDs) can for example be used as light sources. The signal unit, in particular the light source, can, for example, be disposed at the surface of the control feeding pan. The signal unit, in particular the light source can, for example, also be arranged (preferably together with the filling level sensor) inside a feeding shaft, wherein preferably one or several sections of the feeding shaft are open or translucent or transparent. One or several light sources can, for example, also be arranged in such a way that they are aligned along a transparent disc and cause light refraction at the refracting edges.

A signal unit, in particular a light source can, for example, also be a luminous ring, which preferably encircles the feeding shaft. If the feeding shaft broadens to the feeding pan, the position at the feeding shaft can be determined by choosing the diameter of the luminous ring. The signal unit can also comprise several signal sources, for example designed in a rod shape, which are preferably arranged in a circle around the feeding shaft. One or several signal sources can, for example, be arranged on the outside of the feeding shaft, inside the feeding shaft, on the upper end of the wall of the feeding shaft, on support arms of the control feeding pan, or on a connecting ring of the support arms. Signal units designed as light sources emit light preferably at least in part in the direction of a feeding dish. If the filling level sensor is, for example, inserted from the outside in the feeding shaft, it can be preferred to attach the signal unit to the filling level sensor.

In addition or alternatively, preferably infrared radiation can be used as heat radiation to enhance attractiveness. Acoustic signals can, for example, be (recorded or imitated) human or animal sounds, such as a call of a hen, or uniform or varying tones with continuous or varying frequency (for example humming sounds). The sound in the signal source can, for example, be produced mechanically, aerodynamically, and/or thermodynamically.

Furthermore, it is preferred that the signal source is designed to produce a magnetic field that can be perceived by poultry. The magnetic field, in particular a magnetic field whose intensity corresponds more or less to a terrestrial magnetic field, can help, via the magnetic sense or sensitivity to magnetic fields, to exert influence on the poultry's orientation. A magnetic field generated by the signal source is preferably designed to guide more poultry to the control pan.

It is particularly preferred that the signal unit is designed to emit two or several different feeding signals. For this, the signal unit can comprise two or several signal sources which can also be spatially separated from one another.

The signal unit can emit the feeding signal and/or two or several different feeding signals preferably intermittently and/or continuously. For this, the signal unit is basically preferably designed to emit the feeding signal or the feeding signals only intermittently, continuously, or both intermittently and continuously. In the latter case, this means that the signal unit can emit feeding signals either intermittently or continuously.

Furthermore, the signal unit is preferably designed to emit a feeding signal and/or two or several different feeding signals with the same and/or different intensity or the same or different intensities. The signal unit can emit a feeding signal and/or two or several different feeding signals preferably either with the same or different intensities. Furthermore, it is preferred that the signal unit can emit a feeding signal and/or two or several different feeding signals preferably either with the same or different intensities. For example, it can be preferred that the signal unit emits light in several colors, but with the colors being emitted with different intensities. For example, the intensity of blue and/or violet light components compared to yellow and/or red light components can preferably be increased.

It is particularly preferred to combine a visual feeding signal with an acoustic feeding signal, since such combination can particularly enhance attractiveness for poultry. Such a combination can, for example, be that a visual and an acoustic feeding signal are emitted simultaneously or alternately.

In another embodiment, it is preferred that the signal unit is designed to determine or vary the duration and/or intensity and/or type of the feeding signal and/or the duration of a break between feeding signal emissions depending on a control parameter. This way the control feeding pan can, for example, be adapted to different boundary and operating conditions.

Variations in the feeding signal emission, for example with regard to duration, interruption, type, and/or intensity can help to prevent or minimize habituation so as to ensure that the feeding signal continues to attract the poultry over a longer period of time, in particular, days, weeks, months.

Furthermore, it is preferred to store the control parameter in the signal unit and/or the filling level sensor and/or to allow for it to be transmitted from an external data acquisition unit, data processing unit, and/or data storage unit to the signal unit and/or the filling level sensor.

The control parameter can also preferably be stored in the signal unit and/or the filling level sensor itself and be accessible directly in the signal unit or via a wired or wireless connection with the filling level sensor. It is also possible that a user enters the control parameter directly into the signal unit, the filling level sensor, and/or the control feeding pan. Another possibility to provide the control parameter is to provide it in a data acquisition unit, data processing unit, and/or data storage unit and transmit it from there to the signal unit and/or the filling level sensor, wherein the transmission can be wireless or with cable. It can, for example, also be preferred to define the control parameter with user preferences via external data acquisition units, data processing units, and/or data storage units. Furthermore, it is, in particular, preferred to make the control parameter available by other data acquisition units, data processing units, and/or data storage units of poultry keeping, for example by a central control computer of poultry feeding or poultry keeping and/or other data acquisition units, data processing units, and/or data storage units, in particular those specific to poultry keeping, as, for example, animal weigh scales.

In particular, it is preferred that the control parameter comprises one, two, or several parameters from the following group: time of the day, brightness, and/or temperature in the barn and/or the surroundings; number of poultry, age, and/or weight and/or size of the poultry; user preferences, feed, and/or water consumption; and time interval since the last control of a conveyor drive and/or a distribution drive.

Considering the time of the day as a control parameter has the advantage that frequenting of the control feeding pan can be increased at specific feeding times. Considering brightness as control parameter has the advantage that light as a feeding signal is in particular highly effective, since there is not much light in the barn. Heat radiation, for example infrared radiation, in particular with low temperature in the barn, can also increase attractiveness. The number of poultry in the barn or per feed line can preferably also be considered as a control parameter. The weight of the poultry can preferably be determined by means of animal weigh scales in the barn, as for example described in U.S. Pat. No. 8,707,908, and from there, if possible, provided as control parameter via a central control system. User preferences can preferably also be considered as control parameter. Age and/or size of the poultry can preferably also be made available by a central control system. Feed and/or water consumption can also be considered as control parameter, preferably in a specific period of time.

Another great advantage of the control parameter results from the consideration of the time that has elapsed since the last control, in particular activation of a conveyor drive and/or the distribution drive. In particular, it is preferred that a maximum duration between the emissions of feeding signals is not exceeded. Said maximum duration between emissions of feeding signals can preferably also be determined according to the control parameter.

A control parameter can in particular also be a combination of the individual parameters and/or one or several parameters derived from these parameters and/or the control parameter can be determined via an algorithm taking into account one or several parameters.

It can, in particular, be preferred to control the control feeding pan(s) of the different feed lines via different algorithms in a feed system comprising several feed lines each having at least one control feeding pan. In particular, the control feeding pan(s) of a so-called master feed line, which ensures supply for the other feed lines by controlling also the distribution drive of a distribution line, are preferably controlled via a specific algorithm in such a way that they emit feeding signals more frequently than control feeding pan(s) of other feed lines. This can prevent that the other feed lines are undersupplied if the control feeding pan(s) of the master feed line are poorly frequented.

The signal unit is furthermore preferably attached to the control feeding pan. It is, in particular, preferred that the signal unit is attached to the filling level sensor. The attachment of the signal unit to the control feeding pan or the filling level sensor can preferably be detached.

The signal unit or at least a part thereof, for example one of several signal sources of a signal unit, can also be designed as a separate unit and preferably separated from the five other elements of the control feeding pan. The signal unit as a separate unit can, for example, be located separately from the other elements of the control feeding pan (such as mounting element, feeding shaft, feeding dish, filling level sensor) and form the control feeding pan together with these other elements. For example, the signal unit or at least a part thereof can be arranged next to the other elements of the control feeding pan, for example mounted to the conveyor line or located on the floor of the barn in the area of the other elements of the control feeding pan, for example, next to them or underneath. The signal unit or a part thereof can, for example, also be located at the wall or the ceiling of the barn. It is preferred that the signal unit, if it is arranged as separate unit separately from the other elements of the control feeding pan, is located closer to the other elements of the control feeding pan, preferably in their close proximity than to another feeding pan that is not designed as a control feeding pan. Alternatively, a signal unit can also be located further away from the other elements of the control feeding pan. It is in particular preferred that the signal unit, if it is arranged as a separate unit separated from the other elements of the control feeding pan, is arranged and designed in such a way that a feeding signal emitted by the signal unit is directed in such a way it diverts the attention of the poultry to the control feeding pan and/or in particular the area of the control feeding pan, in particular in the area of the feeding dish, which can be perceived by the poultry. For example, a signal source can be designed in such a way that it emits a bundled feeding signal in direction of the other elements of the control feeding pan, such as a headlight or a directional speaker.

It can, for example, also be preferred that the signal unit and the filling level sensor are integrated units.

According to another aspect of the invention, the above-mentioned object is solved by a feeding system for poultry keeping, comprising a feed line with a conveyor line, a conveyor drive, a feed container, a feeding pan, and the above-described control feeding pan.

A feed line can preferably comprise two, three, or several feeding pans and at least one, but possibly also two, three, or several control feeding pans. Furthermore, a feeding machine is preferably placed between the feed container and the conveyor line of a feed line. A feeding system can have two, three, or several feed lines that are preferably connected to a fodder silo via a joint distribution line, wherein feed can be conveyed from the fodder silo preferably by means of a distribution drive via a distribution line into the feed container of the feed lines.

The feeding system according to the invention and its possible further embodiments have particular characteristics which are described above with regard to the control feeding pan. In regard to the advantages, versions of embodiments, and embodiment details of the feeding system and their further embodiments, reference is made to the above description in regard to the corresponding features of the control feeding pan.

According to another aspect, the above-mentioned object is solved by a method for feeding poultry in poultry keeping comprising the following steps: providing the above-mentioned feeding system; activating the conveyor drive to convey feed via the conveyor line to the feeding pan and the control feeding pan; stopping the conveyor drive according to a drive control signal generated by the filling level sensor of the control feeding pan; and emitting a feeding signal that can be perceived by poultry by means of a signal unit.

The conveyor drive to convey feed via the conveyor line to the feeding pan and the control feeding pan is preferably activated according to a drive control signal generated by the filling level sensor of the control feeding pan.

The method and its possible further embodiments have features and method steps, respectively, which make them particularly suitable to be used for a control feeding pan according to the invention in a feed system according to the invention and its respective further embodiments. In regard to the advantages, versions of embodiments, and embodiment details of this method and their further embodiments, reference is made in the meantime to the above description in regard to the corresponding features of the conveyor.

A preferred embodiment of the invention is described as an example based on the attached figures.

BRIEF DESCRIPTION OF THE DRAWINGS

The following is shown in.

DETAILED DESCRIPTION OF THE PREFERRED EMBODIMENTS

Figure 1:
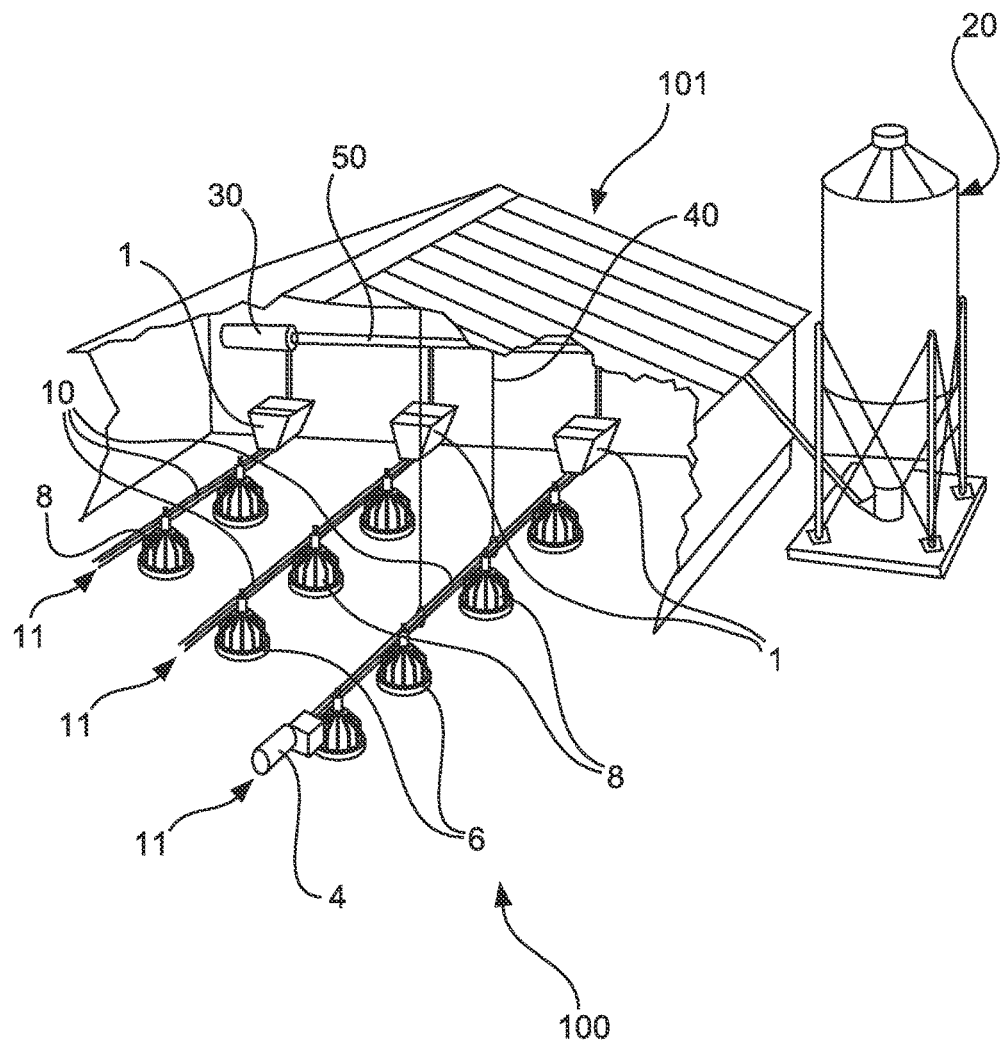
FIG. 1 is a fragmentary perspective view of a poultry barn with an exemplary embodiment of a feeding system according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
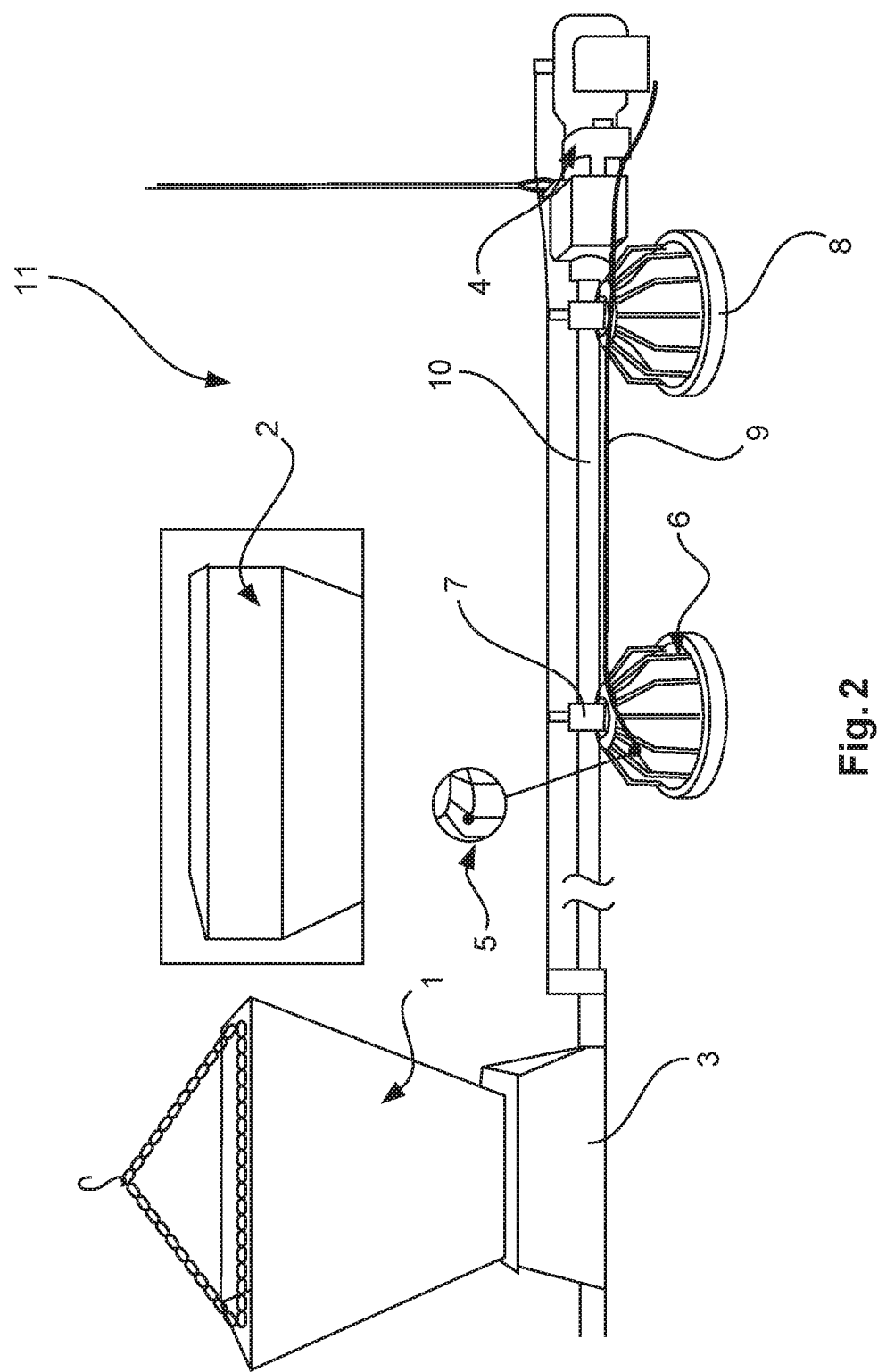
FIG. 2 is a side perspective view of a feed line with an exemplary embodiment of a control feeding pan according to the invention.
Figure 3:
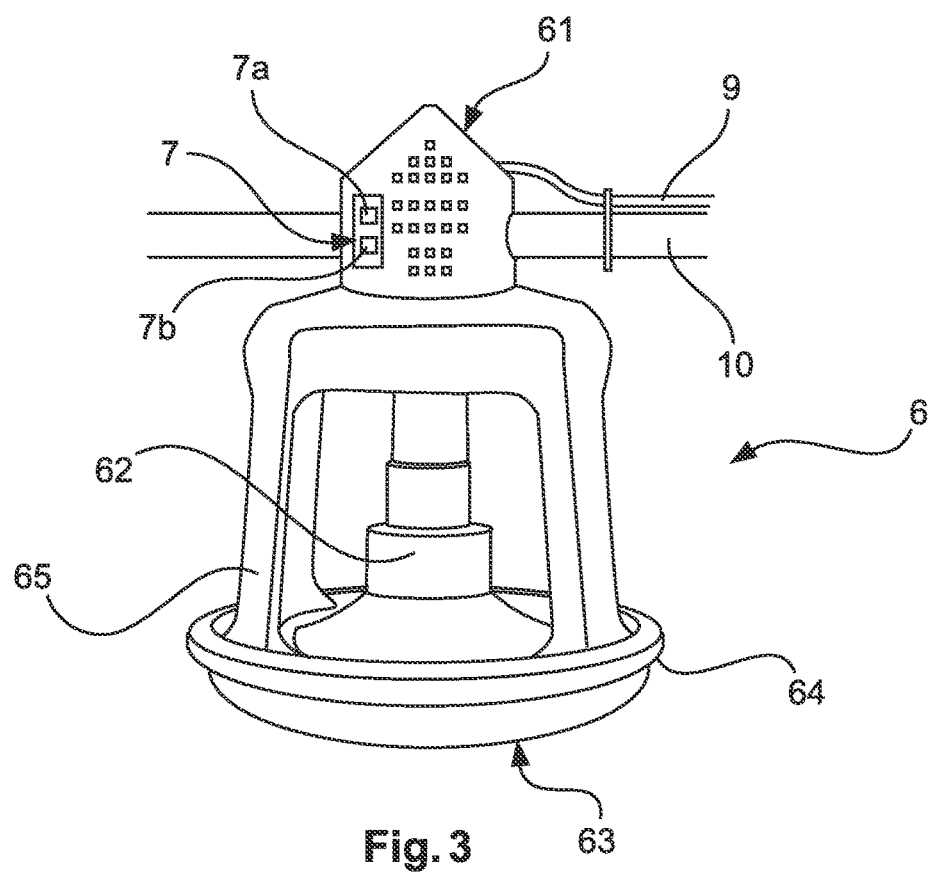
FIG. 3 is an upper side perspective view of a further exemplary embodiment of a control feeding pan according to the invention.

FIG. 1 shows barn 101 for poultry keeping with feeding system 100. FIG. 2 shows feed line 11 in greater detail. FIG. 3 shows an embodiment of control feeding pan 6 with filling level sensor 5, which is shown in more detail in FIG. 4, and a schematic view of signal unit 7. FIGS. 5 to 8 show further exemplary embodiments of control feeding pans according to the invention 6', 6''', 6'', 6'''' with further advantageous embodiments of signal units 7', 7'', 7''', 7''''. Similar elements or elements that essentially have identical functions are to be given the same character reference numbers; for better identification, the different embodiments of the control feeding pan and the signal units are identified by a corresponding " ".

Feeding system 100 shown in FIG. 1 comprises three feed lines 11, each having a conveyor line 10, several feeding pans 8, and each a control feeding pan 6 (only shown for two of the three feed lines 11). Furthermore, the three feed lines 11 each show conveyor drive 4 (only shown for one of the three feed lines 11) via which a conveyor spiral or an auger of conveyor line 10 can be driven to convey feed from feed container 1 via feeding machine 3 to feeding pans 8 and control feeding pan 6. As is shown in FIG. 2, feed container 1 can optionally be equipped with attachment 2.

Feed lines 11 are attached to the ceiling of the barn with mounting 40 so that feed lines 11 are adjustable in height. This can serve to adjust the height of feeding pans 8 and control feeding pans 6 to the height of the poultry. The height adjustability by means of mounting 40 in particular serves to significantly lift feed lines 11 for cleaning purposes.

Feed is stored in fodder silo 20, mostly outside barn 101. Fodder silo 20 is connected to feed containers 1 via distribution line 50 so that feed can be conveyed from fodder silo 20 to feed containers 1 of feed lines 11 when the conveyor spiral or auger of distribution line 50 is driven by distribution drive 30.

Figure 4:
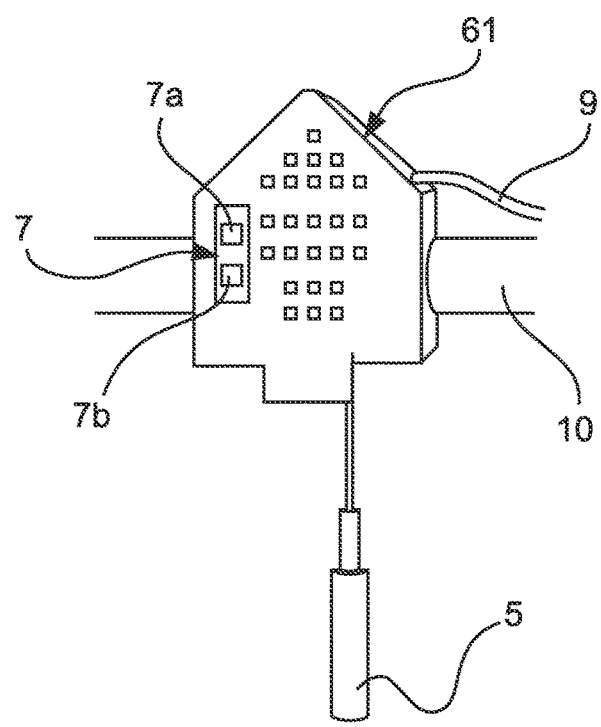
FIG. 4 is an upper side perspective view of a part of the control feeding pan illustrated in FIG. 3.

Filling level sensor 5 shown in FIGS. 2 and 4 can monitor, inside control feeding pan 6, the filling level in control feeding pan 6. Depending on this filling level, filling level sensor 5 can generate a drive control signal which controls the conveyor drives of feed lines 11. As the filling level in control feeding pan 6 falls below a predetermined minimum filling level, a drive control signal can be generated which activates conveyor drives 4 so that feed can be conveyed through conveyor lines 10 to feeding pans 8 and control feeding pans 6. If the filling level sensor 5 of control feeding pan 6 indicates that a maximum feed level has not been reached, another drive control signal can be generated which stops conveyor drives 4 and thus the feed supply to feeding pans 8 and control feeding pans 6 via conveyor lines 10. The drive control signals generated by the filling level sensor thus preferably serve to control conveyor drives 4. Alternatively or additionally, the drive control signals generated by filling level sensor 5 can also be used to control distribution drive 30. Alternatively or additionally, distribution drive 30 can also be controlled by filling level sensors (not shown) in feed containers 1.

Control feeding pans 6 are mounted fixed or swiveling with mounting elements 61 to conveyor lines 10. Feed gets through openings (not shown) in conveyor line 10 through feeding shaft 62 into feeding dish 63, which comprises collar 64 to minimize or prevent loss of feed. Control feeding pan 6 further comprises a supporting ring with arms 65.

The following elements of control feeding pan 6 shown in FIG. 3 are essentially also components of feeding pan 8: mounting element 61, feeding shaft 62, feeding dish 63 with collar 64 and supporting ring with arms 65.

Filling level sensor 5 is suspended, as shown in FIG. 4, from mounting element 61 of control feeding pan 6. Filling level sensor 5 protrudes in the state shown in FIG. 3 into feeding shaft 62 and there it can detect the filling level in feeding shaft 62. Filling level sensor 5 is connected via line 9 to conveyor drive 4 so that a drive control signal generated by filling level sensor 5 can be transmitted via line 9 to control conveyor drive 4.

As shown in the schematic view in FIGS. 2 to 4, signal unit 7 is located at mounting element 61. In FIGS. 2 to 4, signal unit 7 is located at mounting element 61 of control feeding pan 6. Signal unit 7 can also be located at other parts of control feeding pan 6 or designed as a separate unit and, for example, attached to the conveyor line next to the other elements of the control feeding pan or fixed to the floor, wall, or ceiling of the barn, and emit the feeding signal preferably in such a way that it can be perceived by the poultry in the area of the control feeding pan.

Figure 5:
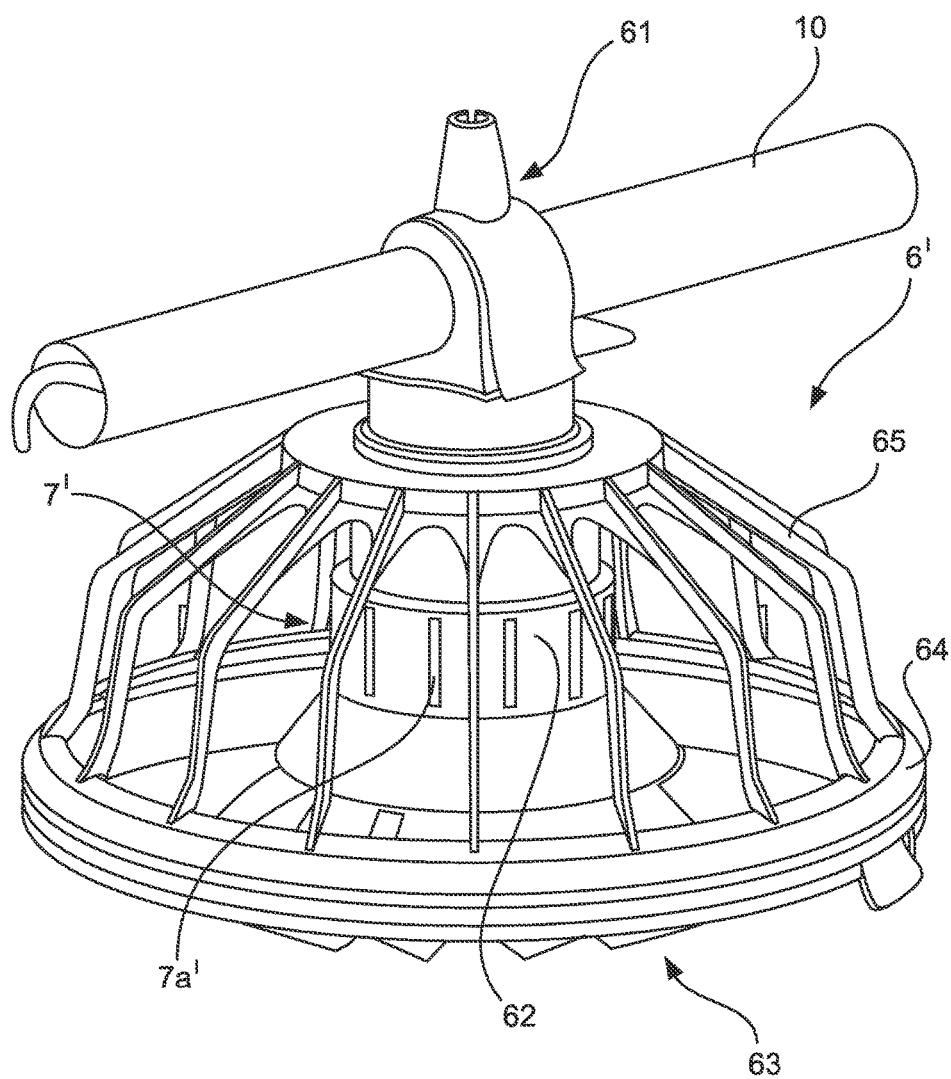
FIG. 5 is an upper side perspective view of a further exemplary embodiment of a control feeding pan according to the invention.

In the example of control feeding pan 6' shown in FIG. 5, signal unit 7' comprises several light sources 7'a which are each designed as rod-shaped LEDs that are arranged on feeding shaft 62.

Figure 6:
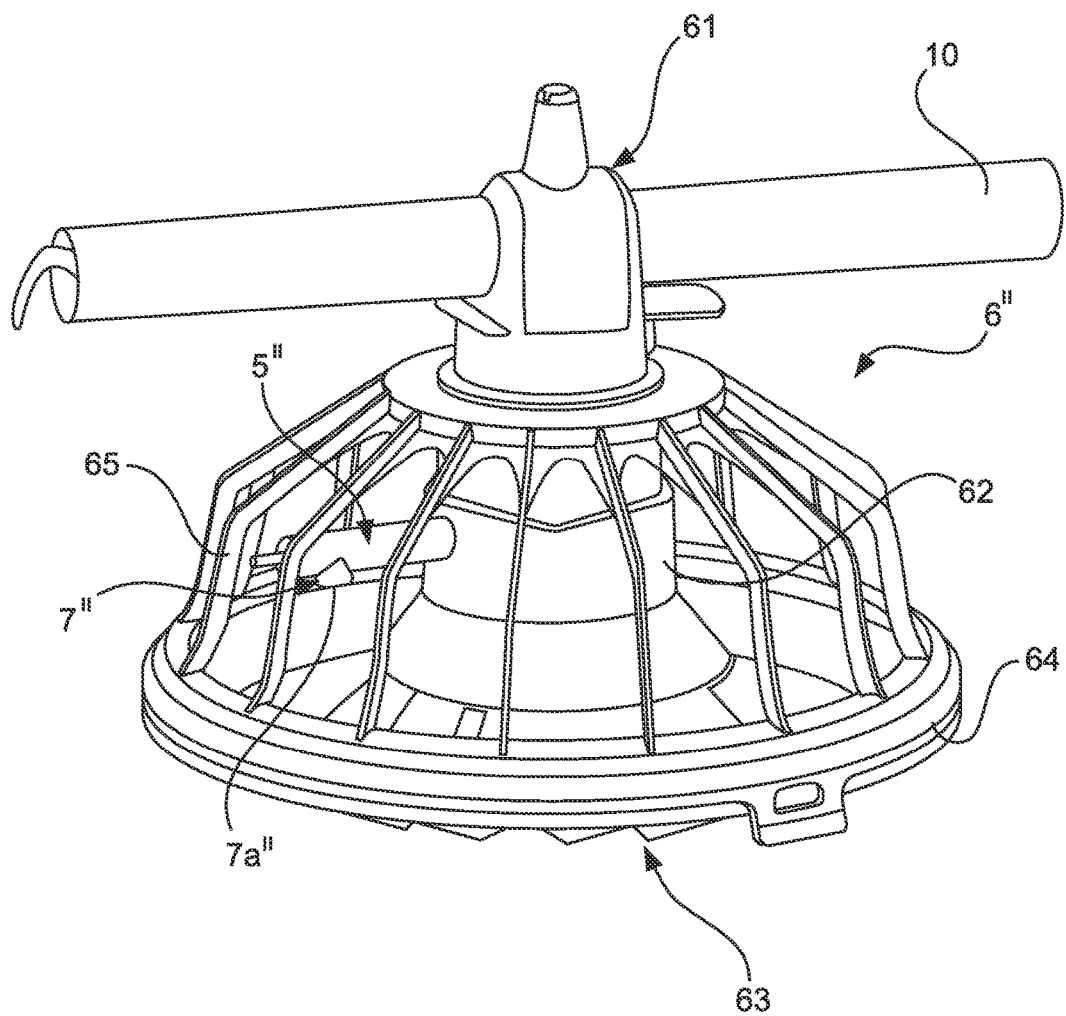
FIG. 6 is an upper side perspective view of a further exemplary embodiment of a control feeding pan according to the invention.

In control feeding pan 6" shown in FIG. 6, light source 7"a of signal unit 7" is installed on the outside of filling level sensor 5" which is inserted into feeding shaft 62. Installing signal unit 7" on filling level sensor 5" has, amongst other things, the advantage that a joint cable connection is easy to realize.

Figure 7:
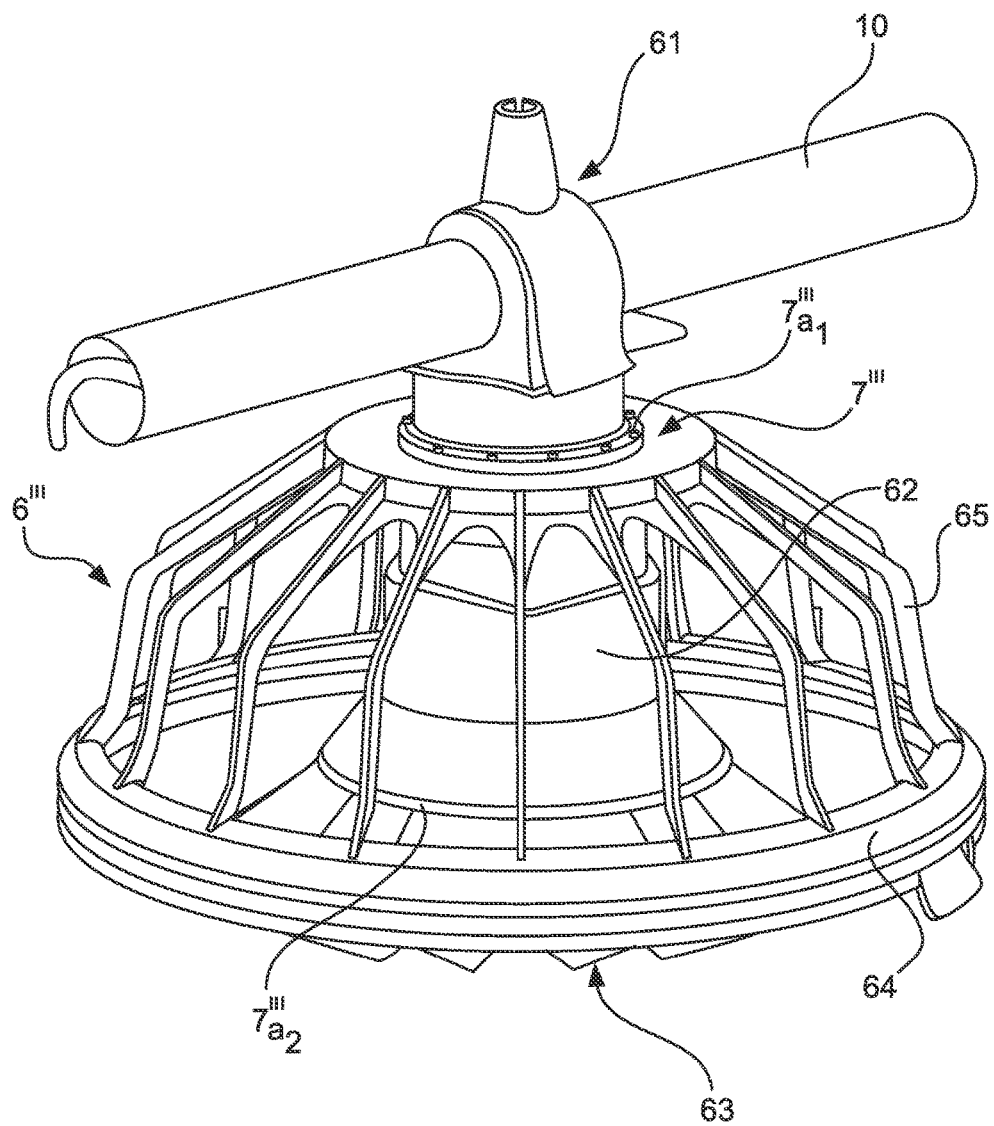
FIG. 7 is an upper side perspective view of a further exemplary embodiment of a control feeding pan according to the invention.

In FIG. 7, several LEDs 7'''a1 are installed as light sources of signal unit 7''' at the upper edge of feeding shaft 62, wherein feeding shaft 62 is completely or in part translucent. In the example shown in FIG. 7, LEDs 7'''a1 light from above into the translucent wall of feeding shaft 62 so that the wall of feeding shaft 62 is illuminated. The light can, for example, be refracted at the lower end or on one or several edges of the wall of feeding shaft 62. Alternatively, one or several light sources can also be arranged inside feeding shaft 62 so that the light generated by the light sources can penetrate outside.

Figure 8:
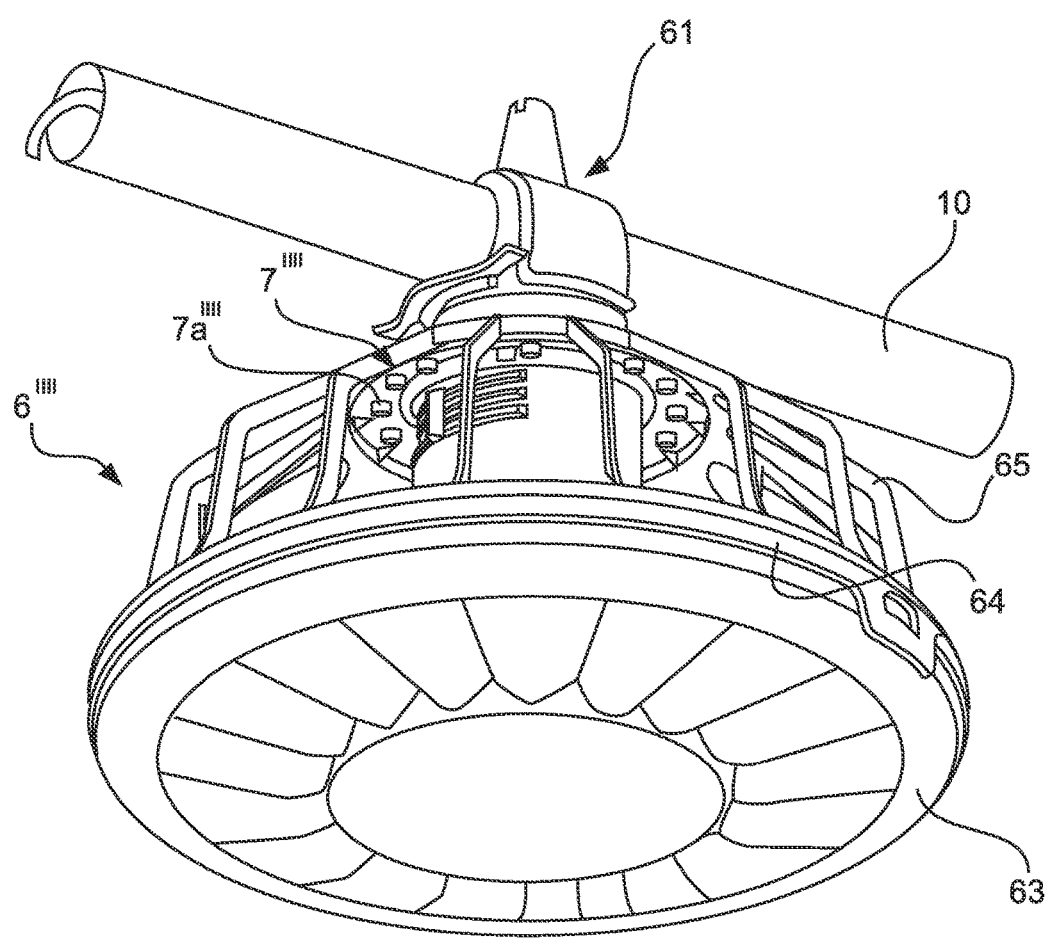
FIG. 8 is a lower side perspective view of a further exemplary embodiment of a control feeding pan according to the invention.

In FIG. 8, feeding pan 6"" is shown, in which signal unit 7"" comprises several light sources 7""a designed as LEDs, which are installed at an upper connecting ring of holding arms 65 and from there shine in direction of feeding dish 63.

Signal unit 7, 7', 7", 7''', 7"" and/or filling level sensor 5, 5" can be connected, wired or wireless, to a central control unit (not shown) of feeding system 100.

Signal unit 7, 7', 7", 7''', 7"" in the examples shown in FIGS. 2-8 comprises a light source 7a, 7'a, 7"a and in FIGS. 2-4 additionally a speaker 7b. Signal unit 7, 7', 7", 7''' can emit visual feeding signals via the light sources and (if present) emit acoustic feeding signals via an acoustic signal source. Other acoustic signal sources can also be used as sound sources in addition to or instead of speakers. Preferably, the feeding signals are emitted intermittently, whereby the maximum duration between the feeding signal emissions is determined according to a control parameter. In particular, the maximum duration between the feeding signal emissions depends on the time elapsed since the last activation of conveyor drives 4.

Preferably, visual signals with light radiation, in particular blue and/or violet light and/or ultraviolet radiation, and additionally or alternatively, specific sounds are used as feeding signals. Preferably, for example, a hen's call can be used as acoustic signal and/or sounds that can easily be generated from mechanical sound sources.

These feeding signals can encourage the poultry to frequent the control feeding pans 6 more often, since the feeding signals help to increase attractiveness of the control feeding pans 6 compared to the other feeding pans 8. This can prevent that, due to poorly frequented control feeding pans with high filling level, conveyor drives 4 are not being activated for a longer period of time which would then result in the feeding pans 8 in barn 101 being undersupplied.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A feeding system for poultry keeping, comprising:
    a feed line with a conveyer line, a conveyer drive, a feed container, a feeding pan and a control feeding pan comprising:
    a mounting element for attaching the control feeding pan to the conveyor line;
    a feeding dish associated with the control feeding pan;
    a feeding shaft through which feed moves from the conveyor line to the feeding dish;
    a filling level sensor for generating a drive control signal; and
    the control feeding pan comprising the filling level sensor and a signal unit for emitting a feeding signal that can be perceived by poultry, wherein said feeding signal is only emitted from the control feeding pan.

2. The feeding system according to claim 1, wherein the feeding signal comprises any of a visual, acoustic, olfactory, or vibration signal.

3. The feeding system according to claim 1, wherein the feeding signal comprises electromagnetic radiation that can be perceived by poultry.

4. The feeding system according to claim 3, where the electromagnetic radiation comprises any of light, heat, or a magnetic field that can be perceived by poultry.

5. The feeding system according to claim 1, wherein the signal unit is designed to emit any of blue, violet, or ultraviolet radiation as the feeding signal.

6. The feeding system according to claim 1, wherein the signal unit comprises a source of electromagnetic radiation and optionally a sound source.

7. The feeding system according to claim 6, wherein the electromagnetic radiation is a light source.

8. The feeding system according to claim 6, wherein the sound source is a speaker.

9. The feeding system according to claim 1, wherein the signal unit emits a plurality of different feeding signals.

10. The feeding system according to claim 1, wherein the signal unit emits an intermittent feeding signal and optionally a plurality of different feeding signals.

11. The feeding system according to claim 1, wherein the signal unit emits a continuous feeding signal and optionally a plurality of different feeding signals.

12. The feeding system according to claim 1, wherein the signal unit emits one or more feeding signals.

13. The feeding system according to claim 1, wherein the feeding signal has a duration, an intensity, a type, and an interval between feeding signals and a control parameter controls actuation of the signal unit to control any of feeding signal's duration, intensity, type, or interval between the feeding signals.

14. The feeding system according to claim 13, wherein the control parameter is provided by any of the signal unit, filling level sensor, an external data acquisition unit, a data processing unit, or a data storage unit.

15. The feeding system according to claim 13, wherein the control parameter is selected from the group consisting of time of day, brightness, temperature, number of poultry, age of the poultry, weight of the poultry, size of the poultry, user preference, feed consumption, water consumption, and time interval since the last control signal.

16. The feeding system according to claim 1, wherein the signal unit and the filling level sensor are an integrated unit.

17. The feeding system according to claim 1, wherein the signal unit is mounted to the filling level sensor of the control feeding pan.

18. A method for feeding poultry in poultry keeping, the method comprising the steps of:
providing a feeding system comprising a feed line with a conveyer line, a conveyer drive, a feed container, a feeding pan, and a control feeding pan further comprising a signal unit and a filling level sensor;
providing a feeding dish for holding a quantity of poultry feed associated with the control feeding pan;
providing a feeding shaft through which poultry feed moves from the conveyor line to the feeding dish;
providing the filling level sensor for generating a drive control signal when the quantity of poultry feed in the feeding dish is below a minimum filling level;
activating a conveyor drive to convey poultry feed via the conveyor line to the control feeding pan in response to the drive control signal generated by the filling level sensor of the control feeding pan;
stopping the conveyor drive in response to a drive control signal generated by the filling level sensor of the control feeding pan when the quantity of poultry feed in the feeding dish is above a maximum filling level; and
actuating the signal unit for emitting a feeding signal that can be perceived by poultry in response to the quantity of poultry feed in the control feeding pan, wherein said feeding signal is only emitted from the control feeding pan.

* * * * *